United States Patent
Acharya et al.

(10) Patent No.: US 9,942,361 B2
(45) Date of Patent: Apr. 10, 2018

(54) REPORTING PAGE COMPOSITION DATA

(71) Applicant: AppDynamics LLC, San Francisco, CA (US)

(72) Inventors: Manoj Acharya, San Francisco, CA (US); Adam Cath, San Francisco, CA (US); Tyler Gary, San Francisco, CA (US); Ian Withrow, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 219 days.

(21) Appl. No.: 14/526,342

(22) Filed: Oct. 28, 2014

(65) Prior Publication Data

US 2016/0119199 A1   Apr. 28, 2016

(51) Int. Cl.
    *H04L 29/06* (2006.01)
    *H04L 29/08* (2006.01)
    *H04L 12/26* (2006.01)
    *H04L 12/24* (2006.01)

(52) U.S. Cl.
    CPC ............ *H04L 67/42* (2013.01); *H04L 43/045* (2013.01); *H04L 43/067* (2013.01); *H04L 67/02* (2013.01); *H04L 41/046* (2013.01); *H04L 43/028* (2013.01)

(58) Field of Classification Search
    CPC ..... H04L 67/42; H04L 43/045; H04L 43/067; H04L 67/02; H04L 43/028; H04L 41/046
    See application file for complete search history.

(56) References Cited

U.S. PATENT DOCUMENTS

| | | | | |
|---|---|---|---|---|
| 9,009,296 | B1* | 4/2015 | Siganporia | G06F 17/30 709/203 |
| 9,317,616 | B1* | 4/2016 | Yates | H04L 67/142 |
| 2002/0052928 | A1* | 5/2002 | Stern | G06F 17/30864 709/218 |
| 2006/0020699 | A1* | 1/2006 | D'Esposito | H04L 41/0681 709/224 |
| 2010/0312854 | A1* | 12/2010 | Hyman | G06Q 30/02 709/217 |
| 2011/0029822 | A1* | 2/2011 | Moser | G06F 11/3636 714/45 |
| 2013/0013378 | A1* | 1/2013 | Norris | G06Q 30/02 705/7.38 |
| 2013/0318227 | A1* | 11/2013 | Feng | H04L 43/0876 709/224 |

* cited by examiner

Primary Examiner — Michael A Keller
(74) Attorney, Agent, or Firm — Parker Ibramih & Berg LLP; James M. Behmke; Stephen D. LeBarron

(57) ABSTRACT

Distributed applications are monitored and page composition metrics are reported in terms of a plurality of phases of a page loading lifecycle. The phases may include first byte received, page rendering time, onload time, post page load time, and other phases. For each phase, data regarding different types of requests may be reported. Data regarding AJAX and iFrame requests may be reported for each phase in a page load, providing more information regarding what is loaded and when. The data may be provided in a graphical 'cascade' format based on the phase. Information for AJAX, iFrame and other requests may include the number of such requests occurring in each phase, the average execution time of the requests, and other data. The requests and phases can be determined for multiple types of browsers based on data collection techniques compatible for each particular browser.

25 Claims, 7 Drawing Sheets

REPORTING PAGE COMPOSITION DATA

BACKGROUND

The World Wide Web has expanded to provide web services faster to consumers. Web services may be provided by a web application which uses one or more services to handle a transaction. The applications may be distributed over several machines, making the topology of the machines that provides the service more difficult to track and monitor.

Monitoring a web application helps to provide insight regarding bottle necks in communication, communication failures and other information regarding performance of the services that provide the web application. Most application monitoring tools provide a standard report regarding application performance. Though the typical report may be helpful for most users, it may not provide the particular information that an administrator wants to know.

There is a need in the art for improved application performance reporting.

SUMMARY

Distributed applications are monitored and page composition metrics are reported in terms of a plurality of phases of a page loading lifecycle. The phases may include first byte received, page rendering time, onload time, post page load time, and other phases. For each phase, data regarding different types of requests may be reported. In particular, data regarding AJAX and iFrame requests may be reported for each phase in a page load. This provides an administrator with more information regarding what is loaded and when, providing better understanding of the page and any issues in page loading. The data may be provided in a graphical 'cascade' format based on the phase. Information for AJAX, iFrame and other requests may include the number of such requests occurring in each phase, the average execution time of the requests, and other data. The requests and phases can be determined for multiple types of browsers based on data collection techniques compatible for each particular browser.

A method for reporting data may begin with reporting an application providing a base page. Requests made as part of providing the base page are identified. The requests may be associated with a particular time period associated with providing the base page. The requests and time period may then be reported.

An embodiment may include a system for reporting data. The system may include a processor, memory, and one or more modules stored in memory and executable by the processor. When executed, the modules may monitor an application providing a base page, identify requests made as part of providing the base page, associate the requests with a particular time period associated with providing the base page, and report the requests and time period.

DETAILED DESCRIPTION

Distributed applications are monitored and page composition metrics are reported in terms of a plurality of phases of a page loading lifecycle. The phases may include first byte received, page rendering time, onload time, post page load time, and other phases. For each phase, data regarding different types of requests may be reported. In particular, data regarding AJAX and iFrame requests may be reported for each phase in a page load. This provides an administrator with more information regarding what is loaded and when, providing better understanding of the page and any issues in page loading. The data may be provided in a graphical 'cascade' format based on the phase. Information for AJAX, iFrame and other requests may include the number of such requests occurring in each phase, the average execution time of the requests, and other data. The requests and phases can be determined for multiple types of browsers based on data collection techniques compatible for each particular browser.

Figure 1:
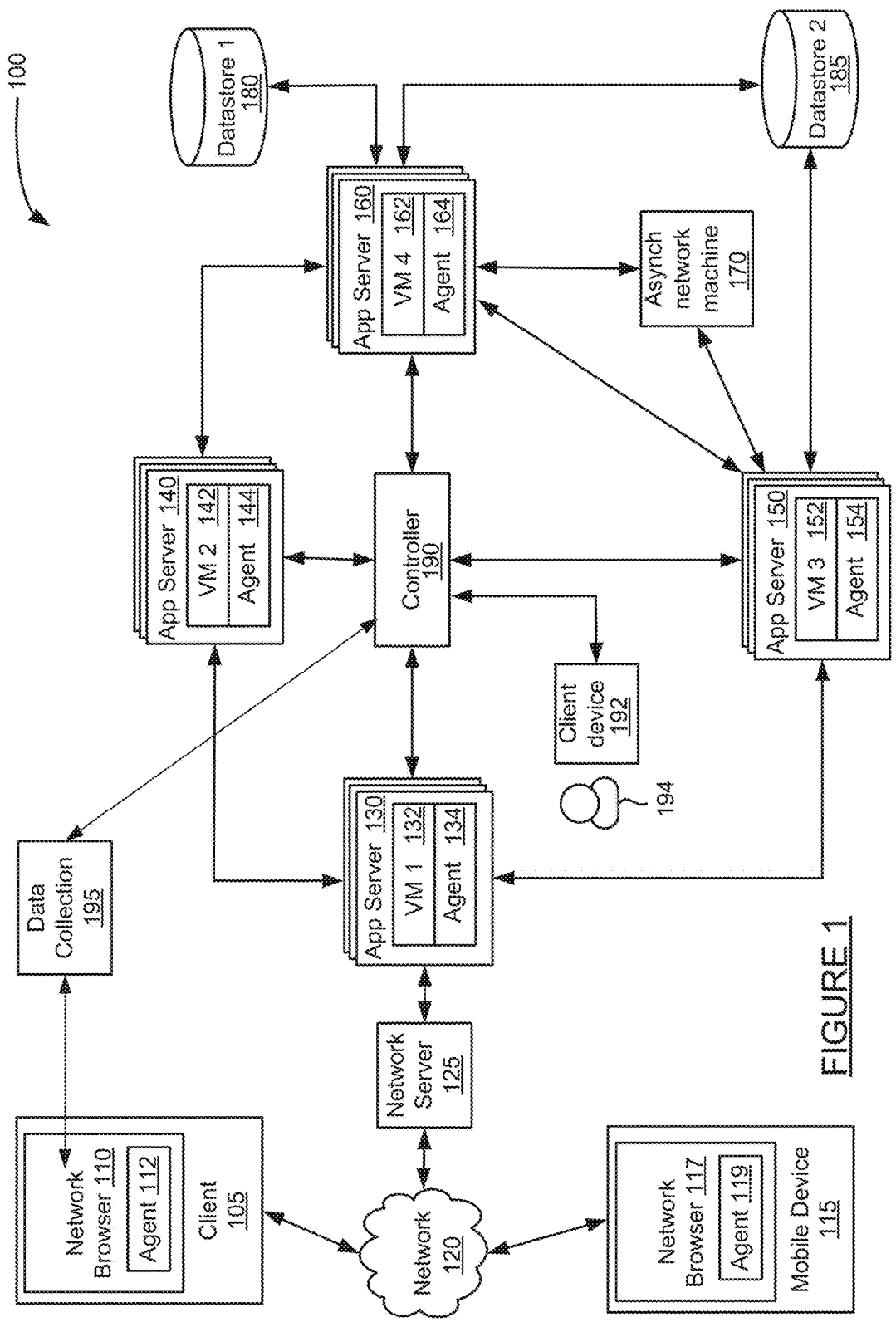
FIG. 1 provides a computing environment for implementing the present technology.

FIG. 1 provides a block diagram of a system for monitoring and reporting page composition data for a distributed transaction. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Network browser 110 may include AJAX code and iFrames and be implemented as a navTimeBrowser, a non-navTimeBrowser, or other browser type.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, and any other application, API, or other component of client 105. Agent 112 may determine network browser navigation timing metrics, access browser cookies, monitor AJAX and other code, and transmit data to data collection 160, controller 190, or another device. Agent 112 may perform other operations related to monitoring a request at client 105 as discussed herein.

In some instances, agent 112 may detect a base page load, child page load, and the timing of calls, including AJAX calls and iFRAMES during the loading of different pages. The timing of the AJAX and other calls may be associated with a particular phase of the page processing.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may repot data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks.

Network server 125 is connected to network 120 and may receive and process requests received over network 120. Network server 125 may be implemented as one or more servers implementing a network service, and may be implemented on the same machine as application server 130. When network 120 is the Internet, network server 125 may be implemented as a web server. Network server 125 and application server 130 may be implemented on separate or the same server or machine Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Virtual machine 132 may be implemented by code running on one or more application servers. The code may implement computer programs, modules and data structures to implement a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132.

In some embodiments, server 130 may include applications and/or code other than a virtual machine. For example, server 130 may include PHP code, Ruby code, or other code to implement applications and process requests received from a remote source. When a serer includes a PHP module, for example, the PHP may have entry points and exit points that are modified with "hooks" which inform an agent when the PHP module is called or makes a call to another node. Though examples discussed herein may refer to a virtual machine, it is intended that the functions discussed with respect to a virtual machine may be performed by PHP applications or other code.

Agent 134 on application server 130 may be installed, downloaded, embedded, or otherwise provided on application server 130. For example, agent 134 may be provided in server 130 by instrumentation of object code, downloading the application to the server, or in some other manner. Agent 134 may be executed to monitor application server 130, monitor code running in a or a virtual machine 132 (or other program, such as a PHP program), and communicate with byte instrumented code on application server 130, virtual machine 132 or another application on application server 130. Agent 134 may detect operations such as receiving calls and sending requests by application server 130 and virtual machine 132. Agent 134 may receive data, for example from instrumented code of the virtual machine 132, and process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (memory, processor, and so on). A tier of nodes may include a plurality of nodes which may process a similar business transaction, may be located on the same server, may be associated with each other in some other way, or may not be associated with each other.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application Ser. No. 12/878, 919, titled "Monitoring Distributed Web Application Transactions," filed on Sep. 9, 2010, U.S. patent application Ser. No. 13/189,360, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive runtime data, including data associated with monitoring client requests at client 105 and mobile device 115, from data collection server 160. In some embodiments, controller 190 may receive runtime data from each of agents 112, 119, 134, 144 and 154. Controller 190 may associate portions of business transaction data, communicate with agents to configure collection of runtime data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as content page, e.g. a web page, which may be provided to and rendered through a network browser application on client device 192.

Figure 2:
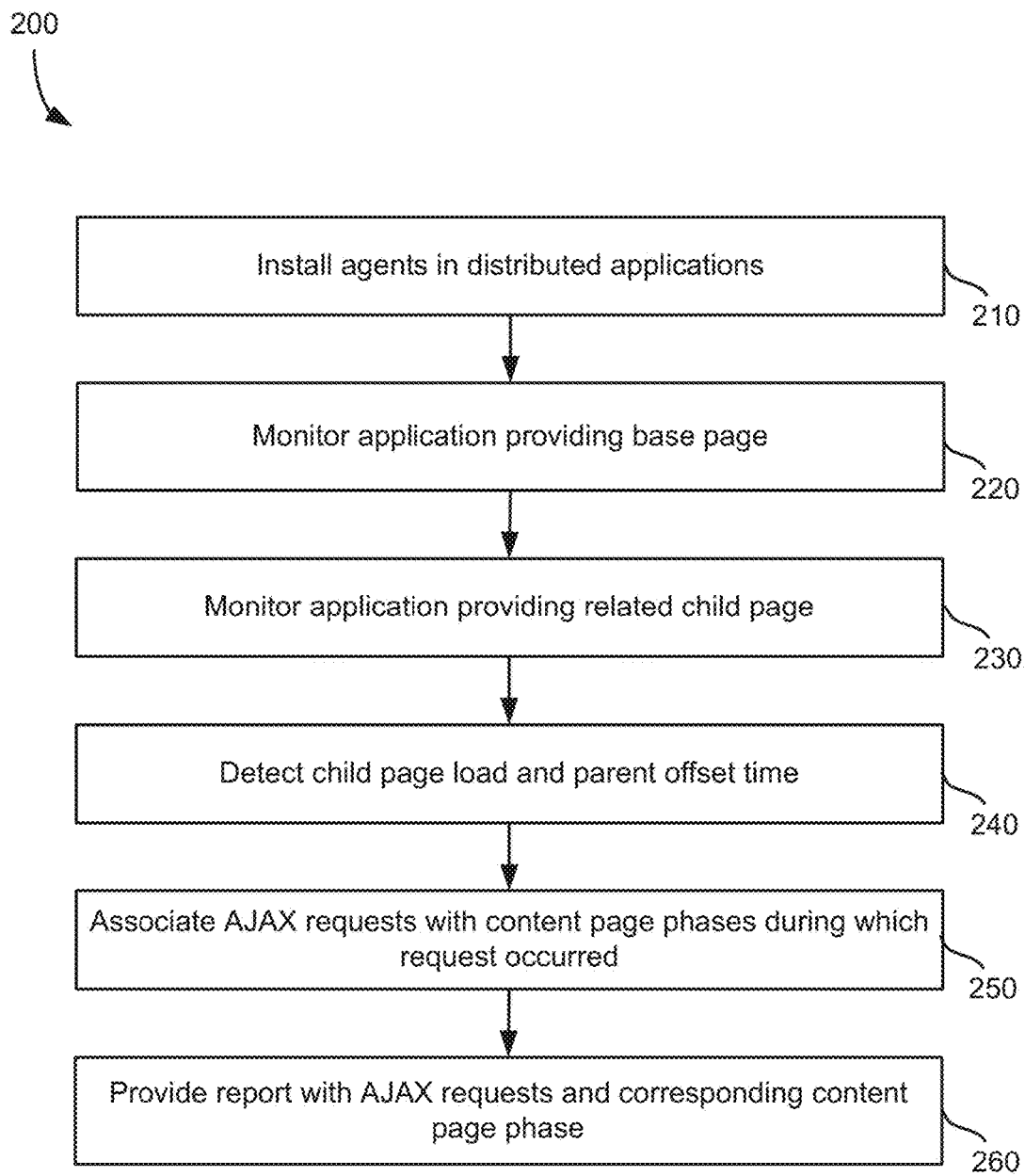
FIG. 2 provides a method for providing page composition information.

FIG. 2 provides a method for providing page composition information. The method of FIG. 2 may be provided by one or more agents monitoring a distributed application as shown in the system of FIG. 1. First, agents may be installed in a distributed application at step 210. The agents may be installed manually, by remotely downloading the agents to a particular machine, or otherwise installed. In some instances, one or more agents may be installed per application, server, browser application, or other location.

An application providing a base page may be monitored at step 220. For example, servers 130-160 in the system of FIG. 1 may include multiple agents which monitor a distributed transaction implemented on those servers. An agent may also be installed on one or more of client 105 or 115 to monitor the client side events of the distributed application processed on the servers. The agents may monitor the distributed application at the servers and clients, collect information, and process the information.

In some embodiments, an agent may insert code into one or more applications, a network browser, or other code to detect calls which provide the base page. The agent or code created or associated with the agent may detect browser calls or detect calls that create a new page or page updates. Monitoring an application which provides a base page is discussed in more detail below with respect to the method of FIG. 3.

An application providing a child page related to the base page is monitored at step 230. A related child page is a page that is created in response to an event by code in a corresponding base page. In some embodiments, a browser may create a child page in response to an event occurring at the network browser, a remote application, or some other event.

An event at a network browser may be in response to user input, a browser page event, or some other event. The browser side events and application side events of a request may both be monitored when monitoring an application that provides the related child page.

A child page load is detected and a parent offset time is determined at step 240. Detecting a child page load may be performed differently for different browser types. For example, for Ajax requests, pages may be intercepted and applications may be monitored when they start and the return may be recorded as well. For iFrames, there may be no call back when an iFrame is fetched. Therefore, iFrames require more work to monitor. navTime Browsers may use navigation start metrics to monitor an iFrame. In particular, a window.performance.timing.navigation start command may be used to determine when an iFrame is fetched. For non-navTime browsers, a base phase may be determined based on a response start command, or child end command. This method may not correlate the event to a particular phase, but only detect if an iFrame is detected before or after an on load event.

An Ajax request may be associated with a content page phase during which the request occurred at step 250. Page phases may include, for example, a navigation start phase, a first byte received phase, a last byte received phase, a DOM interactive phase, and an on load phase. Providing the child page in response to an event can be associated with a particular phase during which the event occurred. In particular, an Ajax request can be associated with a particular page phase. Each Ajax request may be associated with one of these phases to provide more information about the Ajax timing information.

Once the Ajax requests are associated with a particular phase or time period, a report may be provided with the Ajax requests and the corresponding content page phase at step 260. For example, a report may indicate Ajax requests that may be present in a page, the frequency of Ajax calls within that page, and the average execution time or response time for each Ajax call in that page. An image of an interface providing more information for a page composition with Ajax calls in particular phases is provided in the interface of FIG. 5 and discussed in more detail below.

Figure 3:
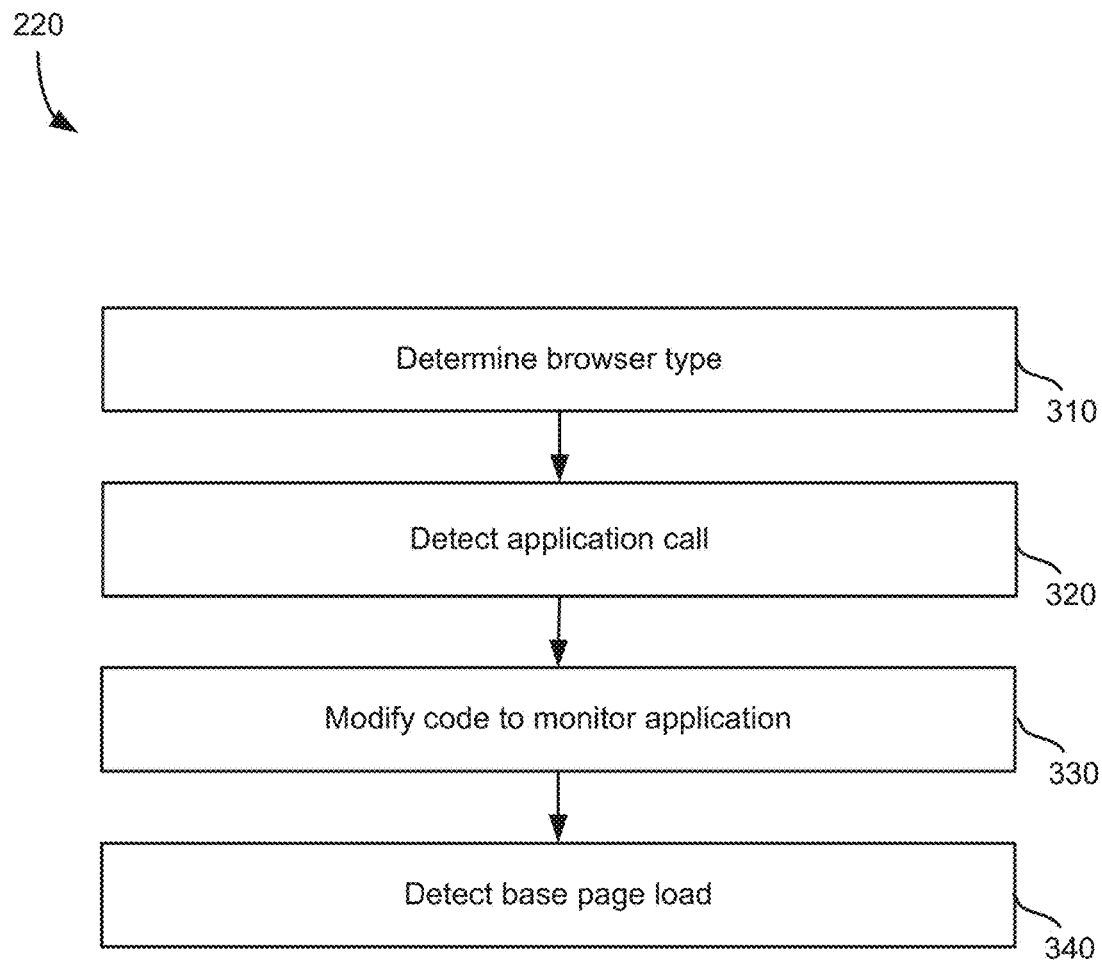
FIG. 3 provides a method for monitoring an application providing a base page.

FIG. 3 is a method for monitoring an application providing a base page. The method of FIG. 3 provides more detail for step 220 of the method of FIG. 2. First, a browser type may be determined at step 310. The browser type may be determined by requesting information from the browser or device operating system by the agent. The browser type may be an iOS browser associated with Apple computer, of Cupertino, Calif., a navTime Browser, a non navTime Browser, or other type of browser. An application call from the browser may then be detected at step 320. The application call may be detected by an agent located on the server which receives the call from the detected browser type or by the agent installed on the browser. The call may also be determined by code inserted into the browser by the agent.

Code may be modified to monitor the application associated with the detected call at step 330. In some embodiments, an agent may insert code if the detected call matches an entry in a list of calls that should be monitored. A base page load is then detected by the modified code at step 340. Detecting the base page load is discussed in more detail below with respect to the method of FIG. 4.

Figure 4:
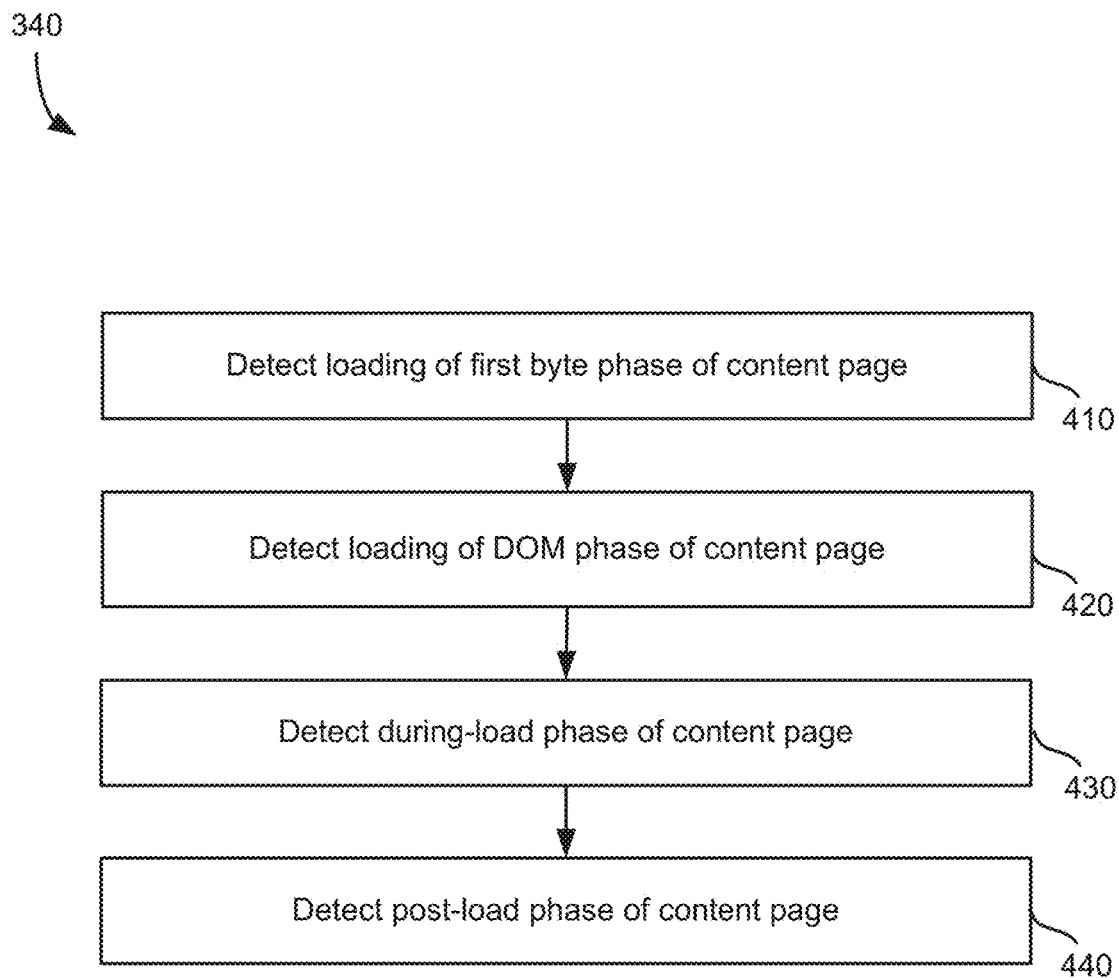
FIG. 4 provides a method for detecting a base page loading.

FIG. 4 provides a method for detecting a base page load. The method of FIG. 4 provides more detail for step 340 of the method of FIG. 3. The base page load may be detected and divided into one or more phases. For example, detected in phases of a first byte phase, DOM phase, during-load event phase, and load complete phase. In some instances, other loading of a base page may be split into phases other than these.

First, the loading of a first byte phase of a content page is detected at step 410. The first byte phase may include a time window during which the first byte is received and loaded by a network browser application in response to a request to a server or other machine for content page data. A loading of a document object model (DOM) of a content page is detected at step 420. After that phase, a during load phase is then detected for the content page at step 430. A post load phase may be detected for the content page at step 440.

Figure 5:
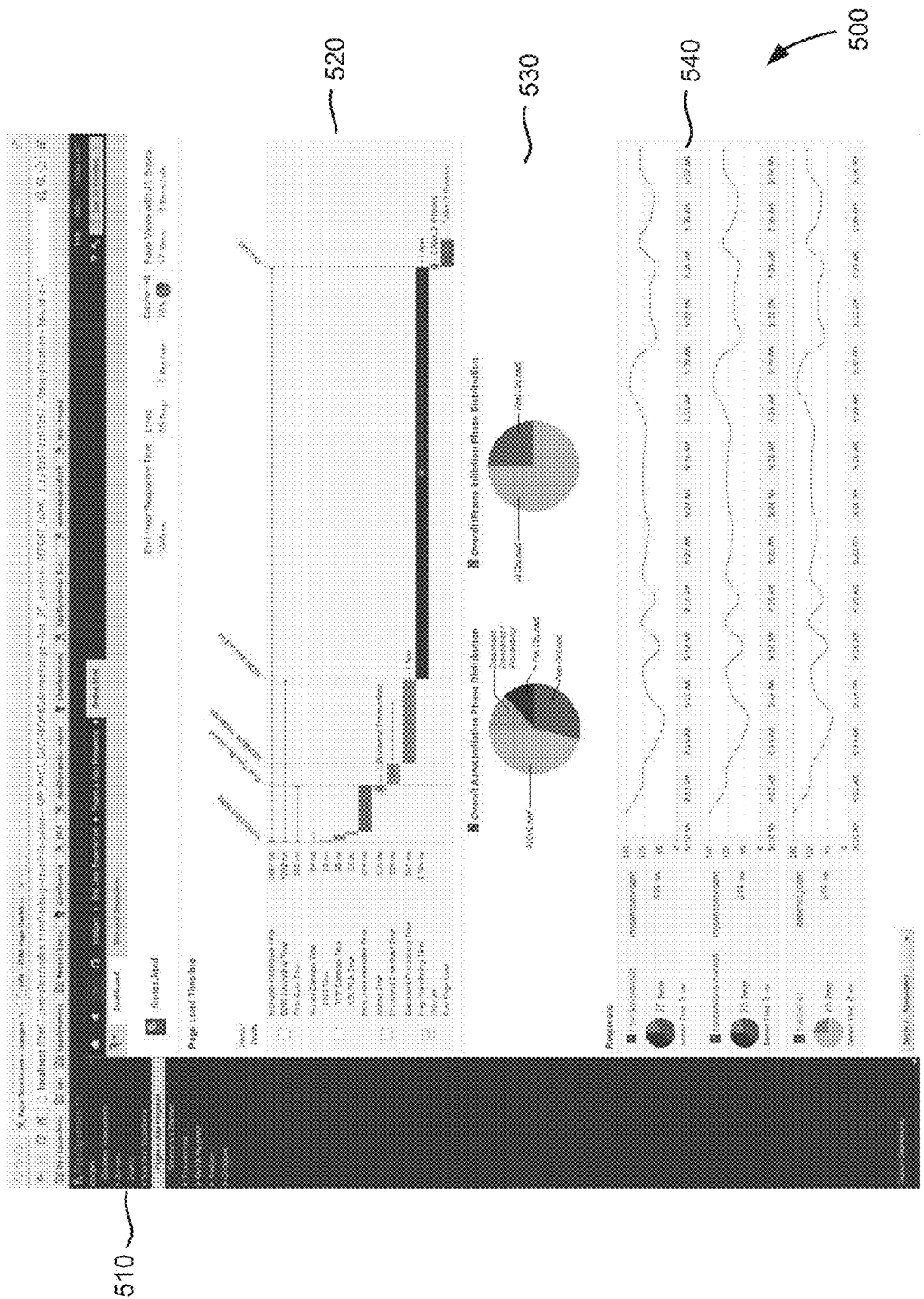
FIG. 5 provides an interface for providing page composition information in a graphical format.

FIG. 5 is an interface for providing a composition of a page having Ajax requests in a particular phases. The interface 500 of FIG. 5 includes a menu area 510, page load timeline graphics 520, Ajax and iFrame information 530, and request information 540. In menu area 510, options of business transactions, servers, events, user experience, troubleshoot, alert and respond, analyze, and configure are provided for user selection. The interface of FIG. 5 indicates that End User Experience is currently selected. Within the end user experience menu, a submenu for pages and Ajax request is selected.

The page load timing graphics includes a list of trends and details, a timeline divided into phases, and graphics to indicated information for the trends and details across the timeline. For example, cascaded graphical presentation provides timing information for server connect time, response available time, server time, document download time, page rendering time, onload time, and post page load time. The time periods are graphically presented in a color corresponding to a particular phase. In addition to the graphical information, actual timing information is also provided, for example in milliseconds.

The Ajax and iFrame information 530 of the interface provides the overall Ajax initiation phase distribution and the overall iFrame initiation phase distribution. In particular, the interface indicates that most of the overall AJAX initiation phase distribution occurs in onload and the least time in pre-onload. Similar, the iFrame initiation phase distribution indicates that most of the iFrame time occurs in onload.

The request information 540 of the interface provides information for several requests as well as the frequency of the requests, the server time taken up by the requests, and other information for each request over periods of time.

Figure 6:
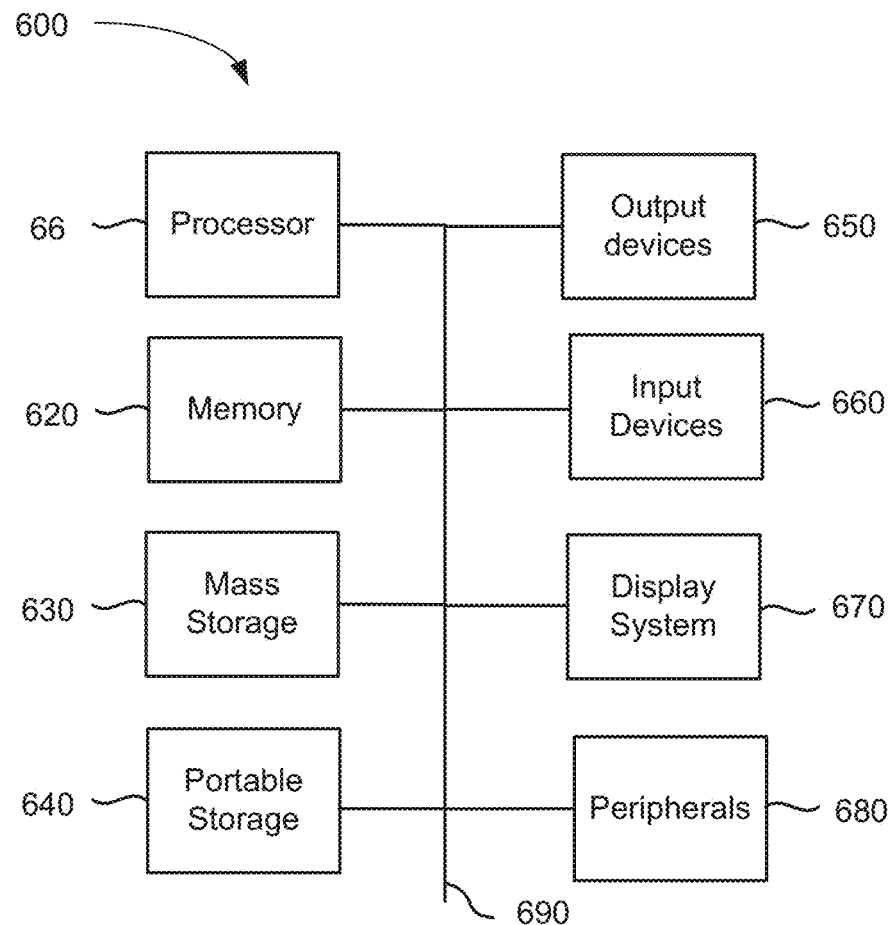
FIG. 6 provides a computing environment for implementing the present technology.

FIG. 6 is a block diagram of an exemplary computing system for implementing the present technology. System 600 of FIG. 6 may be implemented in the contexts of the likes of client computer 65, servers 130, 140, and 150, controller 190 and client device 192. The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 7:
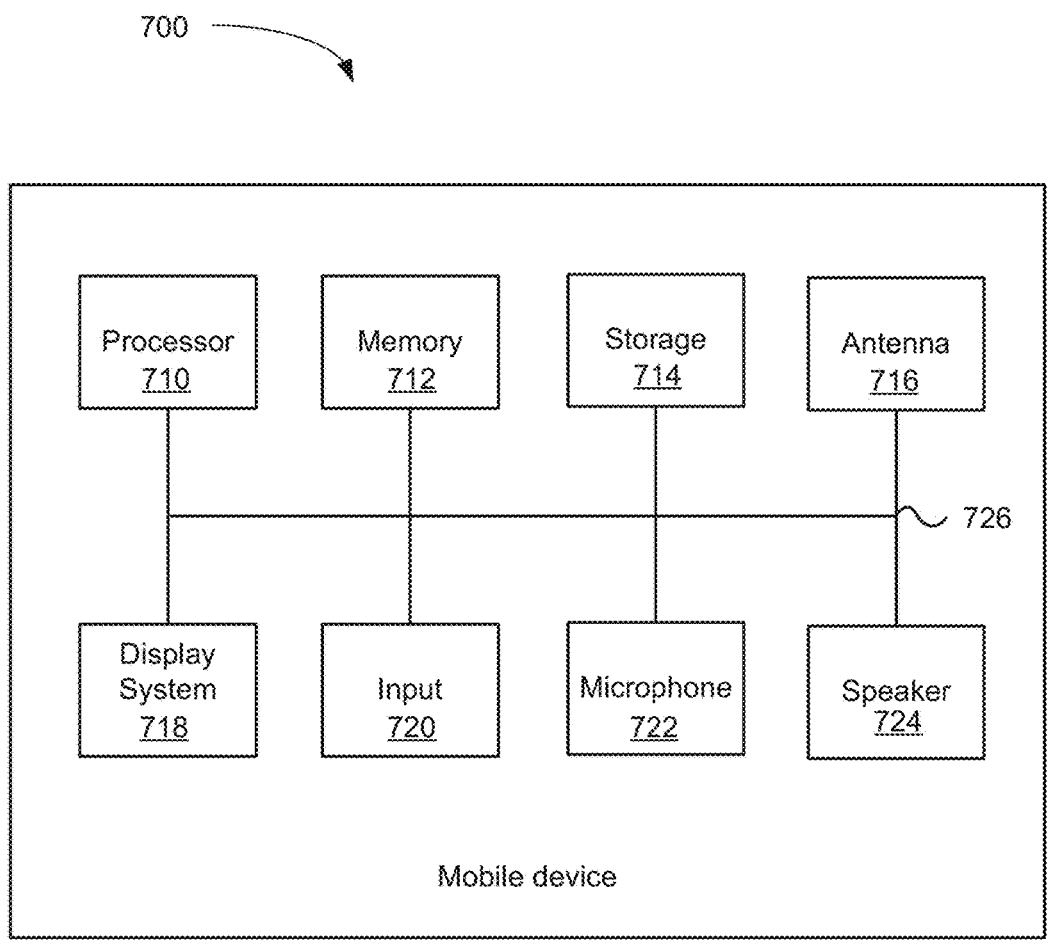
FIG. 7 provides a block diagram for a mobile device.

FIG. 7 is a block diagram of an exemplary mobile device for implementing the present technology. The system of FIG. 7 may be used to implement mobile device 75, and optionally client device 192. Mobile device 700 of FIG. 7 includes one or more processors 710 and memory 712. Memory 712 stores, in part, programs, instructions and data for execution and processing by processor 710. The system 700 of FIG. 7 further includes storage 714, one or more antennas 716, a display system 718, inputs 720, one or more microphones 722, and one or more speakers 724.

The components shown in FIG. 7 are depicted as being connected via a single bus 726. However, the components 710-824 may be connected through one or more data transport means. For example, processor unit 710 and main memory 712 may be connected via a local microprocessor bus, and storage 714, display system 718, input 720, and microphone 722 and speaker 724 may be connected via one or more input/output (I/O) buses.

Memory 712 may include local memory such as RAM and ROM, portable memory in the form of an insertable memory card or other attachment (e.g., via universal serial bus), a magnetic disk drive or an optical disk drive, a form of FLASH or PROM memory, or other electronic storage medium. Memory 712 can store the system software for implementing embodiments of the present invention for purposes of loading that software into main memory 710.

Antenna 716 may include one or more antennas for communicating wirelessly with another device. Antenna 716 may be used, for example, to communicate wirelessly via Wi-Fi, Bluetooth, with a cellular network, or with other wireless protocols and systems. The one or more antennas may be controlled by a processor 710, which may include a controller, to transmit and receive wireless signals. For example, processor 710 execute programs stored in memory 712 to control antenna 716 transmit a wireless signal to a cellular network and receive a wireless signal from a cellular network.

Display system 718 may include a liquid crystal display (LCD), a touch screen display, or other suitable display device. Display system 718 may be controlled to display textual and graphical information and output to text and graphics through a display device. When implemented with a touch screen display, the display system may receive input and transmit the input to processor 710 and memory 712.

Input devices 720 provide a portion of a user interface. Input devices 720 may include an alpha-numeric keypad, such as a keyboard, for inputting alpha-numeric and other information, a touch-screen, microphone, camera, buttons or switches, a trackball, stylus, or cursor direction keys.

Microphone 722 may include one or more microphone devices which transmit captured acoustic signals to processor 710 and memory 712. The acoustic signals may be processed to transmit over a network via antenna 716.

Speaker 724 may provide an audio output for mobile device 700. For example, a signal received at antenna 716 may be processed by a program stored in memory 712 and executed by processor 710. The output of the executed program may be provided to speaker 724 which provides audio. Additionally, processor 710 may generate an audio signal, for example an audible alert, and output the audible alert through speaker 724.

The mobile device system 700 as shown in FIG. 7 may include devices and components in addition to those illustrated in FIG. 7. For example, mobile device system 700 may include an additional network interface such as a universal serial bus (USB) port.

The components contained in the computer system 700 of FIG. 7 are those typically found in mobile device systems that may be suitable for use with embodiments of the present invention and are intended to represent a broad category of such mobile device components that are well known in the art. Thus, the computer system 700 of FIG. 7 can be a cellular phone, smart phone, hand held computing device, minicomputer, or any other computing device. The mobile device can also include different bus configurations, networked platforms, multi-processor platforms, etc. Various operating systems can be used including Unix, Linux, Windows, Macintosh OS, Google OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for reporting data associated with distributed applications operating over a plurality of networked machines, the method comprising:
   monitoring, by agents installed at the plurality of networked machines including servers and client devices, the distributed applications operating over the plurality of networked machine;
   detecting, by one of the agents at one of the client devices, loading of a base page created or updated by one or more of the distributed applications, wherein the detecting of the loading of the base page includes detecting a plurality of phases of a page loading lifecycle for loading the base page on a network browser;
   detecting loading of a child page related to the base page initiated in response to one of the detected events associated with a corresponding one of the phases of the base page loading lifecycle;
   detecting a browser type of the network browser associated with loading of the base page;
   collecting runtime data from the monitored distributed applications, the collected runtime data including page composition information in terms of the detected plurality of phases of the page loading lifecycle for loading the base page;
   detecting from the page composition information, events and timing of the events associated with the detected plurality of phases of the page loading lifecycle for loading the base page;
   associating the detected events and timing of the events with the phases of the page loading lifecycle, wherein the events include a number requests occurring in a particular phase of the plurality of phases, an average execution time of such requests, or both the number and the average;
   detecting from the runtime data information regarding issues in base page loading; and
   reporting the detected issues, events and timing of the events along with the associated phases.

2. The method of claim 1, including determining the events and the plurality of phases of the page loading lifecycle based on the detected browser type.

3. The method of claim 1, wherein the detecting of events associated with loading of the base page includes detecting an application call from the network browser.

4. The method of claim 3, including monitoring one of the distributed applications associated with the detected application call when the detected application call matches one of predetermined application calls identified for monitoring.

5. The method of claim 1, wherein detecting the loading of the child page is performed based on the detected browser type.

6. The method of claim 1, wherein the plurality of phases includes first byte received, page rendering time, onload time, and post page load time.

7. The method of claim 1, wherein the reporting includes reporting data regarding AJAX or iFrame requests for a particular phase in the page loading lifecycle.

8. The method of claim 1, including determining an offset time for the base page.

9. The method of claim 1, wherein the monitoring includes instrumenting by byte code insertion into the monitored distributed application or the network browser.

10. The method of claim 1, wherein the detected plurality of phases of the page loading lifecycle for loading the base page includes a first byte phase, a document object model (DOM) phase, a during-load event phase, and a load complete phase.

11. The method of claim 1, further comprising:
tracking, by the agents, trends and details regarding requests within each of the particular phases over time.

12. A system for reporting data, comprising:
a server including a memory and a processor; and
one or more modules stored in the memory and executed by the processor to perform operations including:
reporting data associated with distributed applications operating over a plurality of networked machines, the operations including:
monitor, by agents installed at the plurality of networked machines including servers and client devices, the distributed applications operating over the plurality of networked machine;
detect, by one of the agents at one of the client devices, loading of a base page created or updated by one or more of the distributed applications, wherein the detecting of the loading of the base page includes detecting a plurality of phases of a page loading lifecycle for loading the base page on a network browser;
collect runtime data from the monitored distributed applications, the collected runtime data including page composition information in terms of the detected plurality of phases of the page loading lifecycle for loading the base page;
detect from the page composition information, events and timing of the events associated with the detected plurality of phases of the page loading lifecycle for loading the base page, wherein the events include a number requests occurring in a particular phase of the plurality of phases, an average execution time of such requests, or both the number and the average;
detect loading of a child page related to the base page initiated in response to one of the detected events associated with a corresponding one of the phases of the base page loading lifecycle;
detect a browser type of the network browser associated with loading of the base page;
associate the detected events and timing of the events with the phases of the page loading lifecycle;
detect from the runtime data information regarding issues in base page loading; and
report the detected issues, events and timing of the events along with the associated phases.

13. The system of claim 12, wherein the one or more modules are executable to determine the events and the plurality of phases of the page loading lifecycle based on the detected browser type.

14. The system of claim 12, wherein the one or more modules are executable to detect the events associated with loading of the base page including detect an application call from the network browser.

15. The system of claim 14, wherein the one or more modules are executable to monitor one of the distributed applications associated with the detected application call when the detected application call matches one of predetermined application calls identified for monitoring.

16. The system of claim 12, wherein the one or more modules are executable to detect the loading of the child page is performed based on the detected browser type.

17. The system of claim 12, wherein the plurality of phases includes first byte received, page rendering time, onload time, and post page load time.

18. The system of claim 12, wherein the one or more modules are executable to report data regarding AJAX or iFrame requests for each phase in the page loading lifecycle.

19. The system of claim 12, wherein the one or more modules are executable to insert code into the monitored distributed application or a network browser.

20. The system of claim 12, wherein the detected plurality of phases of the page loading lifecycle for loading the base page includes a first byte phase, a document object model (DOM) phase, a during-load event phase, and a load complete phase.

21. A non-transitory computer readable storage medium having embodied thereon a program, the program being executable by a processor to perform operations for reporting data associated with distributed applications operating over a plurality of networked machines, the operations including:
monitoring, by agents installed at the plurality of networked machines including servers and client devices, the distributed applications operating over the plurality of networked machine;
detecting, by one of the agents at one of the client devices, loading of a base page created or updated by one or more of the distributed applications, wherein the detecting of the loading of the base page includes detecting a plurality of phases of a page loading lifecycle for loading the base page on a network browser;
detecting loading of a child page related to the base page initiated in response to one of the detected events associated with a corresponding one of the phases of the base page loading lifecycle;
detecting a browser type of the network browser associated with loading of the base page;
collecting runtime data from the monitored distributed applications, the collected runtime data including page composition information in terms of the detected plurality of phases of the page loading lifecycle for loading the base page;
detecting from the page composition information, events and timing of the events associated with the detected plurality of phases of the page loading lifecycle for loading the base page, wherein the events include a number requests occurring in a particular phase of the plurality of phases, an average execution time of such requests, or both the number and the average;
associating the detected events and timing of the events with the phases of the page loading lifecycle;
detecting from the runtime data information regarding issues in base page loading; and
reporting the detected issues, events and timing of the events along with the associated phases.

22. The non-transitory computer readable storage medium of claim 21, including determining the events and the plurality of phases of the page loading lifecycle based on the detected browser type.

23. The non-transitory computer readable storage medium of claim 21 wherein the detecting of the events associated with loading of the base page includes detecting an application call from the network browser.

24. The non-transitory computer readable storage medium of claim 23, including one of the distributed applications associated with the detected application call when the detected application call matches one of predetermined application calls identified for monitoring.

25. The system of claim 12, wherein reporting data associated with distributed applications operating over a plurality of networked machines includes:
   tracking, by the agents, trends and details regarding requests within each of the particular phases over time.

* * * * *